Jan. 12, 1971  B. D. MORGAN  3,554,835
SLIDABLE ADHESIVE LAMINATE AND METHOD OF MAKING
Filed Aug. 16, 1967

*INVENTOR.*
BURTON D. MORGAN
BY
Oldham & Oldham
ATTORNEYS.

United States Patent Office 3,554,835
Patented Jan. 12, 1971

3,554,835
SLIDABLE ADHESIVE LAMINATE AND METHOD OF MAKING
Burton D. Morgan, Hudson, Ohio, assignor to Morgan Adhesives Company, Stow, Ohio, a corporation of Ohio
Filed Aug. 16, 1967, Ser. No. 661,047
Int. Cl. B44d 5/00
U.S. Cl. 156—234
3 Claims

ABSTRACT OF THE DISCLOSURE

A slidable adhesive laminate composed of several distinct layers including a pressure sensitive adhesive layer, a layer of vinyl film or the like, and a layer of release material. There are two different release layers or means to permit sliding on one release surface until pressure is applied to the laminate.

---

This invention relates to a laminate that can slide on a special released surface layer or means formed therein, when the laminate's backing layer is removed but before a downwardly directed force is applied, thus allowing the correct positioning of the laminate before the adhesive is engaged with a support surface. As the backing layer is removed, only spaced portions of the release coating or removed to leave spaced dots of a release material on a pressure sensitive adhesive layer in the laminate exposed. It is this feature that allows the laminate to slide over any adhesive receptive surface before it is fastened securely to the surface. When force is exerted on the film laminate, the adhesive extrudes from below the dots of the release material and adheres to the receptive surface, or the dots of release material may be fractured to expose the adhesive, or the dots of release material sink into the pressure sensitive adhesive allowing the adhesive to come in close contact with the adhesive receptive surface.

For a better understanding of the laminate of the invention, reference should be had to the accompanying drawings which are fragmentary, vertical sectional views of the different phases of the construction, with the thickness of the layers being greatly exaggerated, of a preferred embodiment of the invention.

Figure 1:
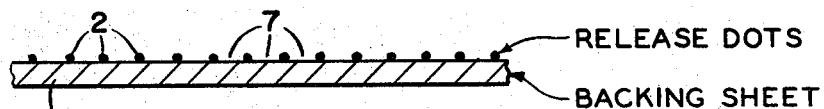
FIG. 1 is a cross-sectional view of the first step in producing the laminate and showing a special dotted release layer on a backing sheet.

Referring more specifically to FIG. 1, it shows the important first step in the process where release dots, composed of silicone or like conventional release chemicals are applied to the release paper or any other conventional backing sheet 1. These dots 2, for example, ideally having .005" as a diameter and .025" on centers, where the thickness of the coat is .0005", cover only part of the area of the release paper 1, leaving gaps 7 between one dot and another and normally are applied to the backing sheet by a rotary press, which slightly embosses the backing sheet when and where the dots are applied thereto. The size and spacing and thickness of the dots will vary with different surface film sheets with the properties thereof. The dots can be relatively thick and closely adjacent for a film that drapes readily and the dots prefearbly are relatively thin and widely spaced for film that is not so flexible and doesn't drape readily. The release material may be dried or cured in a conventional manner. Or, the dotted release layer could be an ink which does not adhere tightly to the backing paper.

Figure 2:
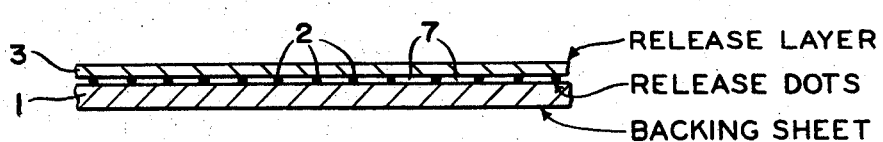
FIG. 2 is a cross-sectional view of the second step in producing the laminate by applying a continuous release coating.

At this point in the processing, a general release material 3, is applied as a coat or layer to cover the entire surface of the release paper 1 and dots thereon so that all the surface area is coated with the release chemical 3, as shown in FIG. 2. The layer 3 is preferably primarily made from a conventional release material, in this instance Dow Chemical Company's Syloff 23, which is a silicone base release. In this example, about 75 parts by weight of such Syloff 23 were used mixed with about 25 parts by weight of nitrocellulose. The layer 3 may, for example, be about .0005" thick and is dried or cured conventionally.

The third step of this process is applying a layer of any known pressure sensitive adhesive 4 to the exposed surface of the release layer 3 in the usual manner. The pressure sensitive adhesive used comprised, for example, 100 parts by weight of GRS 1011 and 70 parts of tackifier, plus about 2 parts of anti-oxidant. The tackifier, Pentalyn H, is made by Hercules Chemical Co. and is a pentaerythritol ester of hydrogenated rosin. The final step in construction of this product is further seen in FIG. 3 where a layer of flexible, usually transparent plastic or elastomeric material, such as vinyl resin film or the like 5, is applied to the adhesive 4. After the completion of these last two steps by conventional means, the entire laminated unit 6 is provided as shown in FIG. 3 and is ready for storage and/or use.

Figure 4:
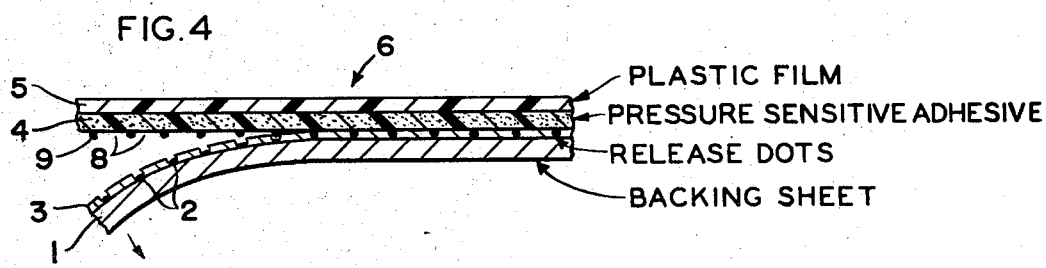
FIG. 4 is a cross-sectional view of the backing sheet being pulled away from the laminate to expose the special release means and adhesive layer provided in the laminate.

The first step in the use of this slidable adhesive laminate is shown in FIG. 4 with some of the release material being removed with the backing layer 1. As the paper layer 1 is peeled from the rest of the laminate 6, the continuous release coat or layer 3 is removed with the backing sheet as it has more affinity to it than to the adhesive. However, the release dots 2 that were first provided on the backing paper shown in FIG. 1, now prevent the adhesion of corresponding dots of the layer 3 to sheet 1. Thus, there are gaps 8 between the dots 9 of the release material on the adhesive 4 where previously this arrangement of dots existed on the backing layer. Also, previously, there had been a continuous coating 3 of a release layer in contact with the adhesive, but now this coating has been pulled off the adhesive by the backing paper and only the dots 9 remain.

When it is desired to secure the plastic film 5 to a surface, the release dots 9 are placed in contact with an adhesive receptive surface and their non-adhesive qualities enable the film material to slide over the said surface to a desired location. Then as pressure is exerted in a downward direction, the adhesive 4 is extruded out to surround the release dots, or the dots are fractured so that the adhesive makes contact with the said surface now enabling the film to adhere to the surface. The film 5 is smoothly pressed against support surface and due to the strong adhering qualities of the pressure sensitive adhesive 4, the film is firmly attached.

Figure 3:
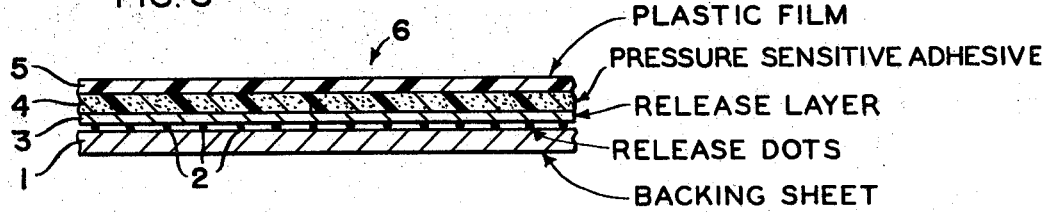
FIG. 3 is a cross-sectional view of the final laminate.

The release layers are shown in exaggerated separated form in FIG. 3 as the layers 1 and 3 will usually at least contact each other at some areas between the dots 2.

This invention provides a convenient means for directly applying an adhesive laminate on any adhesive receptive surface with the useful and desired characteristic of sliding over the surface until the preferred position is achieved. Then the laminate can readily be pressed into a fixed, adhered position.

While one complete embodiment of the invention has been disclosed herein, it will be appreciated that modification of this particular embodiment of the invention may

What is claimed is:

1. A method of making and using an adhesive laminate comprising,
    applying dots of a release material to a backing sheet,
    applying a continuous layer of release material over the release dots on the backing sheet,
    completing the laminate by provision of a pressure sensitive adhesive layer on said release layer and a plastic film layer on the adhesive layer,
    stripping the backing layer from the laminate and exposing dots of said continuous release layer thereby,
    lightly applying the release dotted surface of the laminate to a support and sliding the laminate into a desired position, and
    pressing the laminate against the support to force the pressure sensitive adhesive thereagainst and secure the laminate in position.

2. A method as in claim 1 and including the steps of using the same release material to form said first-named dots and to form said continuous layer of release material, and
    said release layer being more firmly bonded to said backing sheet than to said adhesive layer, said first-named dots of release material preventing dots of said release layer from bonding to said backing sheet.

3. A method as in claim 1 and including the steps of using the same release material to form said first-named dots and to form said continuous layer of release material,
    said release material being a liquid, and
    drying the liquid release material after each application thereof.

References Cited
UNITED STATES PATENTS 3,331,729    7/1967    Danielson et al. ____ 161—406X
3,413,168   11/1968    Danielson et al. ____ 161—406X LELAND A. SEBASTIAN, Primary Examiner U.S. Cl. X.R.

156—235, 249, 289; 161—148, 406